United States Patent
Kadayam et al.

(10) Patent No.: US 9,928,148 B2
(45) Date of Patent: Mar. 27, 2018

(54) CONFIGURATION OF PEERED CLUSTER STORAGE ENVIRONMENT ORGANIZED AS DISASTER RECOVERY GROUP

(71) Applicant: NetApp, Inc., Sunnyvale, CA (US)

(72) Inventors: Harihara Kadayam, Freemont, CA (US); Hrishikesh Keremane, Bangalore (IN); Vaiapuri Ramasubramaniam, Bangalore (IN); Rishabh Mittal, New Delhi (IN); Chaitanya Patel, Morrisville, NC (US); Santhosh Unnikrishnan, Kerala (IN); Sameer Deshpande, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 338 days.

(21) Appl. No.: 14/526,037

(22) Filed: Oct. 28, 2014

(65) Prior Publication Data
US 2016/0057009 A1    Feb. 25, 2016

(30) Foreign Application Priority Data
Aug. 21, 2014    (IN) .......................... 2375/DEL/2014

(51) Int. Cl.
| | | |
|---|---|---|
| *G06F 15/177* | (2006.01) | |
| *G06F 11/20* | (2006.01) | |
| *H04L 12/24* | (2006.01) | |
| *H04L 29/08* | (2006.01) | |
| *H04L 12/751* | (2013.01) | |

(Continued)

(52) U.S. Cl.
CPC ...... *G06F 11/2069* (2013.01); *H04L 41/0663* (2013.01); *H04L 41/0873* (2013.01); *H04L 41/0893* (2013.01); *H04L 45/02* (2013.01); *H04L 45/28* (2013.01); *H04L 67/1097* (2013.01); *H04L 49/357* (2013.01)

(58) Field of Classification Search
CPC ............ G06F 11/2069; H04L 41/0873; H04L 41/0663; H04L 41/0893; H04L 67/1095
See application file for complete search history.

(56) References Cited

U.S. PATENT DOCUMENTS

| | | | |
|---|---|---|---|
| 2007/0195692 A1* | 8/2007 | Hagglund | G06F 11/2058 370/216 |
| 2010/0097941 A1* | 4/2010 | Carlson | H04L 12/40195 370/245 |

(Continued)

*Primary Examiner* — Michael A Keller
(74) *Attorney, Agent, or Firm* — Cooper Legal Group, LLC (57) ABSTRACT

A technique efficiently configures a peered cluster storage environment. The configuration technique illustratively includes three phases: a discovery phase, a node setup phase and a cluster setup phase. The discovery phase may be employed to initiate discovery of nodes of a disaster recovery (DR) group through transmission of multicast advertisement packets by the nodes over interconnects, including a Fiber Channel (FC) fabric, to each other node of the group. In the node setup phase, each node of a cluster assigns its relationships to the nodes discovered and present in the FC fabric; illustratively, the assigned relationships include high availability (HA) partner, DR primary partner and DR auxiliary partner. In the cluster setup phase, the discovered nodes of the FC fabric are organized as the peered cluster storage environment (DR group) configured to service data in a highly reliable and available manner.

20 Claims, 6 Drawing Sheets

(51) Int. Cl.
*H04L 12/703* (2013.01)
*H04L 12/931* (2013.01)

(56) References Cited

U.S. PATENT DOCUMENTS

| | | | | |
|---|---|---|---|---|
| 2012/0215874 | A1* | 8/2012 | Sequeira | H04L 12/12 709/208 |
| 2012/0257603 | A1* | 10/2012 | Mercier | H04W 24/02 370/338 |
| 2013/0046871 | A1* | 2/2013 | Vik | H04L 67/12 709/223 |
| 2013/0336161 | A1* | 12/2013 | Jung | H04W 76/023 370/254 |
| 2014/0189094 | A1* | 7/2014 | Ditya | H04L 45/245 709/224 |
| 2016/0041887 | A1* | 2/2016 | Davis | G06F 11/1612 714/6.2 |

* cited by examiner

CONFIGURATION OF PEERED CLUSTER STORAGE ENVIRONMENT ORGANIZED AS DISASTER RECOVERY GROUP

RELATED APPLICATION

The present application claims priority to Indian patent application entitled CONFIGURATION OF PEERED CLUSTER STORAGE ENVIRONMENT ORGANIZED AS DISASTER RECOVER GROUP the application of which was filed by Kadayam et al. on Aug. 21, 2014 and accorded Indian Application No. 2375/DEL/2014.

TECHNICAL FIELD

The subject matter herein relates to storage environments and, more specifically, to configuration of nodes and clusters of a peered cluster storage environment.

BACKGROUND INFORMATION

A storage system typically includes one or more storage devices, such as disks, into which information (i.e. data) may be entered, and from which data may be obtained, as desired. The storage system may logically organize the data stored on the devices as storage containers, such as files, logical units (luns), and/or aggregates having one or more volumes that hold files and/or luns. The data may be accessed via nodes of the storage system which provide storage services to clients. To improve the availability of the data contained in the storage containers, a plurality of nodes may be interconnected as a peered cluster storage environment configured to provide redundancy with respect to a property that when one or more nodes fail, one or more other nodes may service data access requests, i.e., operations, directed to the storage containers of the failed node(s).

In such a peered cluster storage environment, two nodes may be interconnected as a high availability (HA) pair of a cluster, wherein each node may service the operations directed to its storage containers and only services the operations directed to the storage containers of the other node (i.e., the local node) after a failure of that node, which triggers a takeover sequence on the surviving node (i.e., the HA partner node). In addition, two clusters may be peered to provide further redundancy in the form of disaster recovery (DR), such that when one cluster fails another cluster may perform a switchover and its DR nodes may service operations (e.g., service data access requests) directed to the failed cluster's storage containers. An administrator is typically tasked with manually configuring such a peered cluster storage environment, including identifying all of the nodes and assigning their relationships, such as HA pairs and DR pairs. However, such manual configuration is a laborious procedure that may lead to configuration errors because of the complexity of such multi-node cluster relationships.

BRIEF DESCRIPTION OF THE DRAWINGS

The above and further advantages of the subject matter herein may be better understood by referring to the following description in conjunction with the accompanying drawings in which like reference numerals indicate identically or functionally similar elements, of which.

OVERVIEW

The subject matter herein is directed to a technique for efficiently configuring a peered cluster storage environment. The peered cluster storage environment may include a plurality of nodes interconnected over short and long distance communication media and configured to communicate using various protocols, such as the Fibre Channel (FC) protocol. The communication media (hereinafter "interconnects") may include high availability (HA) interconnects that embody various types of high-speed connection media, such as Infiniband or Ethernet, and FC interconnects that embody high performance serial communication media, such as unidirectional fibres. A plurality of FC switches may cooperate to provide a communication fabric (e.g., FC fabric) configured to facilitate communication among the nodes over the FC interconnects in accordance with the FC protocol. Illustratively, the peered cluster storage environment may be organized as a disaster recovery (DR) group including two HA groups, wherein each HA group includes two nodes.

The configuration technique illustratively includes three phases: a discovery phase, a node setup phase and a cluster setup phase. The discovery phase may be employed to initiate discovery of nodes of the DR group through transmission of multicast advertisement packets (advertisements) by the nodes over the interconnects, including the FC fabric, to each other node of the group. In the node setup phase, each node of a cluster assigns its relationships to the nodes discovered and present in the FC fabric; illustratively, the assigned relationships include HA partner, DR primary partner and DR auxiliary partner. In the cluster setup phase, the discovered nodes of the FC fabric are organized as the peered cluster storage environment (DR group) configured to service data in a highly reliable and available manner.

In the discovery phase, multicast transmission of the advertisements over the FC fabric may be effected by using an Extended Link Service (ELS) of the FC protocol. A payload of the ELS-based advertisement may be determined by a configuration control module of each node. The payload of the advertisement may contain role identification information embodied as properties of the node transmitting the advertisement. In an aspect of the subject matter, the properties advertised by each node may include (i) a cluster identifier (ID) which identifies the cluster associated with the node, (ii) a node system ID which is a unique number that identifies the system hardware, and (iii) a node configuration ID which is illustratively embodied a universally unique ID that identifies the node in the cluster. Illustratively, the ELS service may cooperate with a FC transport module of the node to identify various ports that are present in the FC fabric. The FC transport module may then simulate multicast transmission by transmitting the advertisement, e.g., one-by-one, over ports of a FC-VI adapter using the ELS service.

In the node setup phase, each node of a cluster receiving the advertisement(s) may process the node properties of the advertisement(s) to assign its relationships to the other discovered nodes to thereby establish partner node (e.g., HA, DR) pairs. Illustratively, the configuration control module may configure its node by, e.g., assigning a role of local node to itself and assigning partner roles to each of the discovered nodes. For example, a node on the same local cluster as the local node becomes an HA partner of the local node, while a node on the remote (DR) cluster may become a DR primary partner or DR auxiliary partner of the local node. The assignment of roles may be determined according to an algorithm of the configuration control module that specifies sorting and ordering of discovered nodes on each HA group to thereby enable pairing of partners (i.e., HA partner, DR primary partner or DR auxiliary partner) based on, e.g., ordinal numbering of node system IDs. The configuration control module of each node may construct and organize the resulting assignments as a node list indicating the roles and relationships among all nodes of, e.g., the DR group.

In the cluster setup phase, each node may establish its view of the DR group configuration in response to a command. Illustratively, the command may instruct each node to commit the node list (constructed and organized by the configuration control module of each node) to local storage of the node to persistently store the configuration. Cluster-level activities may then be performed at the node, including verification of software and hardware DR group configuration and, once verified, activation of mirroring. The cluster-level verification may be enabled by a globally reachable service configured as a cluster configuration table that is replicated on each node to enable the node to verify its notion of the peered cluster storage environment (e.g., DR group) configuration.

Advantageously, the configuration technique described herein enables efficient configuration of a peered cluster storage environment (DR group) in an automatic, i.e., without human intervention, manner that provides ease of use, while reducing human error. In addition, the transmission of certain information during the discovery and cluster setup phases of the configuration technique enables gradual construction of a DR group (as well as subsequent scaling of the group) through non-disruptive operation of its constituent nodes. For example, nodes of two distinct HA groups, each operating independently to serve data, may be combined to form a DR group through the exchange of node advertisements and propagation (and replication) of configuration information among the nodes. Moreover, the configuration technique provides a multicast approach for Fibre Channel out-of-band communication.

DESCRIPTION

Figure 1:
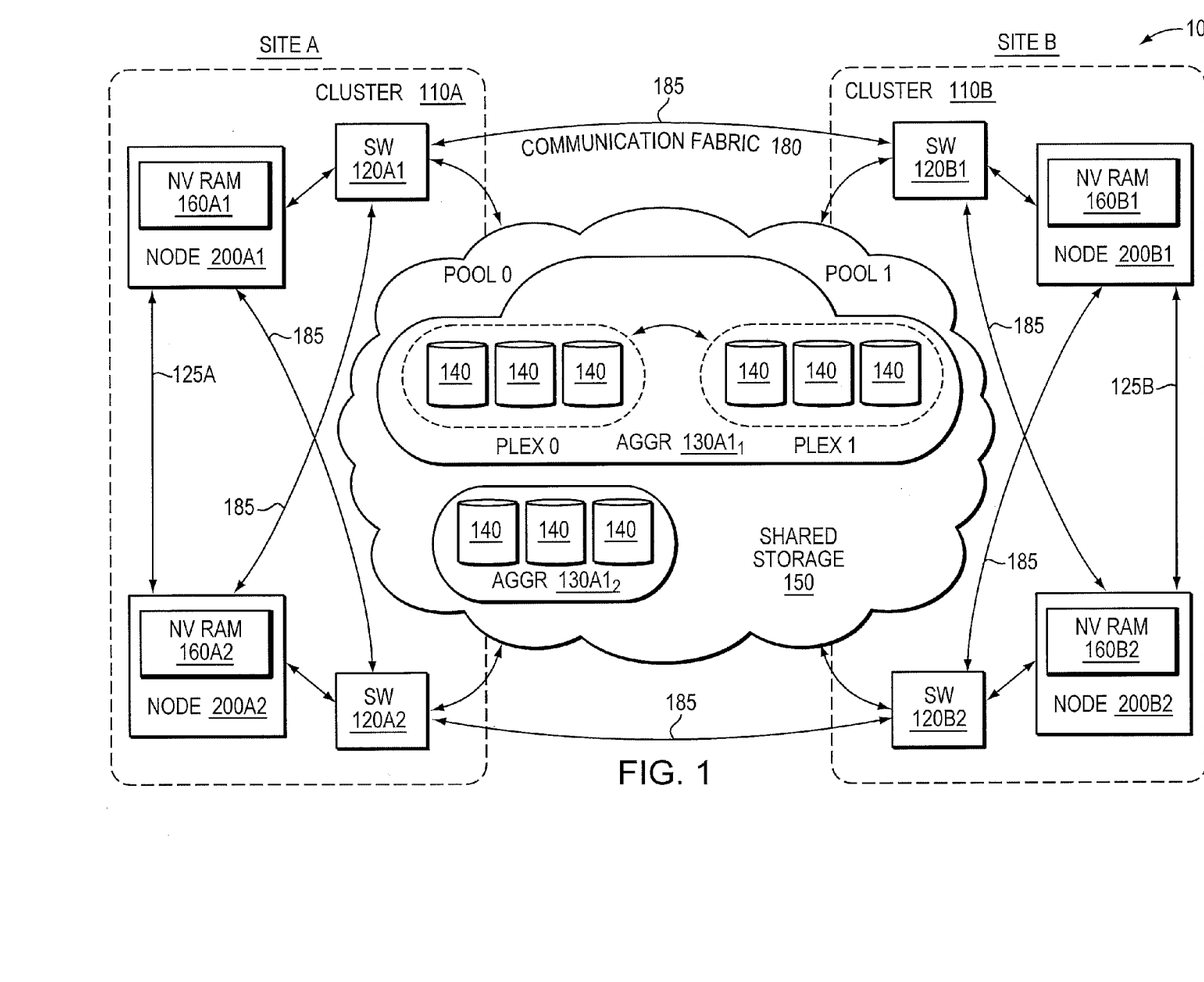
FIG. 1 is a block diagram of an example peered cluster storage environment.

FIG. 1 is a block diagram of an example peered cluster storage environment 100 including nodes 200 (or more specifically 200A1, 200A2, 200B1, 200B2) disposed at multiple sites, e.g., site A and site B. The sites may be physically remote from one another. The nodes 200 at each site may be arranged in a cluster 110 composed of a high availability (HA) pair (e.g., a local node and an HA partner node) interconnected by an HA interconnect 125 (or more specifically 125A, 125B). The HA pair arrangement may provide redundancy within the cluster, such that, if one node should fail, the other node may assume its role by performing a takeover. Similarly, each cluster and its constituent nodes may be paired with another cluster and its constituent nodes to create disaster recovery (DR) pairs (e.g., a local node and DR partner node). The local node may be connected to its DR partner node via a plurality of interconnects, e.g., Fibre Channel (FC) interconnects 185 and switches 120 (or more specifically 120A1, 120A2, 120B1, 120B2) which may be arranged in a redundant relationship at each site. The DR pair arrangement may provide redundancy across sites, such that if the cluster at one site should fail, the cluster at the other site may assume its role by performing a switchover (i.e. a type of cross-cluster takeover).

Whether a node is a local node, an HA partner node, a DR partner node, or a DR auxiliary node (i.e., the HA partner node of a DR partner node) depends on the perspective from which one looks at the peered cluster storage environment 100. For example, from the perspective of node 200A1, node 200A1 is the local node, node 200A2 is the HA partner node, node 200B1 is the DR primary partner node, and node 200B2 is the DR auxiliary partner node. Likewise, from the perspective of node 200B1, node 200B1 is the local node, node 200B2 is the HA partner node, node 200A1 is the DR primary partner node, and node 200A2 is the DR auxiliary partner node. While much of the description below is from the perspective of node 200A1 (such that node 200A1 is referred to as the local node) or from the perspective of node 200B1 (such that node 200B1 is referred to as the local node), perspective from other nodes may be utilized to better illustrate specific concepts. It should be understood that the choice of perspective is simply for purposes of illustration, and that specific nodes may not be limited to singular roles (e.g., local, HA partner, DR primary partner, and DR auxiliary partner), but instead may simultaneously fulfill multiple roles.

Each node 200 is coupled to shared storage 150 via switch (e.g., FC switch) 120. The shared storage 150 includes a plurality of storage devices (e.g., disks) 140 upon which data may be stored. Clients (not shown) may access data stored in the shared storage 150 by interacting with the nodes 200 over, e.g., a network in accordance with a client/server model of information delivery. In response to requests (e.g., data access requests) from the clients, the nodes 200 may perform operations (e.g., service data access requests) directed to the storage devices 140. The storage devices 140 within the shared storage 150 may be physically divided into pools (e.g., Pool 0, Pool 1) which may are located at different sites (e.g., Site A, Site B). Storage devices of a pool may be arranged on one or more disk shelves (not shown). The storage device of each pool may be organized as Redundant Array of Independent (or Inexpensive) Disks (RAID) groups, implemented at a RAID level, such as RAID-4 or another type of RAID implementation, such as RAID double-parity (RAID-DP). It should be understood that a wide variety of other levels and types of RAID may alternatively be utilized.

In an aspect of the disclosure, the HA interconnects 125 may embody various types of high-speed communication media, such as Infiniband or Ethernet, whereas the FC interconnects 185 may embody high performance serial communication media, such as unidirectional fibers. The FC switches 120 may cooperate to provide a communication fabric (e.g., FC fabric) 180 configured to facilitate communication among the nodes 200 and shared storage 150 over the FC interconnects 185 in accordance with an FC protocol, e.g., FC layer 3 link services (FC-LS-3) that provides extended link services over FC. The FC-LS-3 protocol is well known and is described in American National Standard of Accredited Standards Committee INCITS, T11, titled *Fiber Channel Link Services* (*FC-LS*-03), Feb. 21, 2012

(available from http://www.t11.org/ftp/t11/pub/fc/ls-3/12-102v0.pdf), which is hereby incorporated by reference.

One or more RAID groups may be organized into aggregates (AGGRs) 130 (or more specifically 130A1$_1$, 130A1$_2$) that represent collections of storage. The aggregates 130 may include a root aggregate that contains a root volume storing special directories and configuration files, as well as data aggregates that store user data. Each aggregate is generally "owned" by a single node 200 which is arranged to perform operations (e.g., service data access requests) directed to that aggregate. Further, in order to provide greater redundancy than already provided via RAID parity, certain aggregates 130 may be mirrored, such that the RAID groups in the aggregate are themselves mirrored between two groups of storage devices referred to as "plexes" that may be, for example, disposed in different pools (e.g., Pool 0, Pool 1). For example, an aggregate 130A1$_1$ may include a Plex 0 that utilizes storage devices of Pool 0 and a Plex 1 that utilizes storage devices of Pool 1. The RAID groups in Plex 0 may have mirrored counterparts in Plex 1 according to RAID-level mirroring techniques.

To facilitate access to data stored in the shared storage 150, the nodes 200 may further "virtualize" the storage space. For example, a file system, e.g. a Write Anywhere File Layout (WAFL®) file system, may logically organize information (i.e., data) stored on the storage devices 140 into a hierarchical structure of named storage containers, such as directories and files. Each file may be implemented as a set of disk blocks configured to store data, whereas a directory may be implemented as a specially formatted file in which names and links to other files and directories are stored. The file system may further organize the information into a hierarchical structure of storage containers, such as blocks, that are exported as named logical unit numbers (luns). The nodes 200 may service data access requests based on file-based access protocols, such as the Common Internet File System (CIFS) protocol or Network File System (NFS) protocol, to permit access to certain storage containers, such as files and directories. Likewise, the nodes 200 may service data access requests based on block-based access protocols, such as the Small Computer Systems Interface (SCSI) protocol encapsulated over TCP (iSCSI) and SCSI encapsulated over Fibre Channel (FCP), to permit access to other types of storage containers, such as blocks or luns.

Each node 200 may log information, such as ongoing operations (e.g., data access requests) directed to the storage devices of the aggregates 130 owned by the node that have been acted upon (i.e., serviced) but not yet been committed (i.e., persistently stored) to the storage devices. The logged information may be maintained in a non-volatile random access memory (NVRAM) 160 of the node 200 that owns the aggregate 130. During normal operation, information in the NVRAM of the node 200 may be mirrored to the NVRAM of its HA partner node, to provide redundancy. For example and considering node 200A1 as the local node, during normal operation, information in the NVRAM (e.g., 160A1) of the local node (e.g., node 200A1) is mirrored to the NVRAM (e.g., 160A2) of the HA partner node (e.g., node 200A2), and maintained in the NVRAM of the HA partner node. As part of a takeover sequence performed by the HA partner node (e.g., 200A2) in response to a failure of the local node (e.g., node 200A1), the HA partner node may assume the identity of the failed node, access the storage devices utilized by the failed node, replay the mirrored information maintained in its NVRAM (e.g., 160A2), and otherwise take over for the failed node.

Similarly, during normal operation, information in the NVRAM of a node 200 that owns an aggregate may be mirrored to the NVRAM of the DR primary partner node (e.g., node 200B1) and maintained in the NVRAM of the DR primary partner node to provide further redundancy. For example and considering node 200A1 as the local node, during normal operation, information in the NVRAM (e.g., 160A1) of the local node (e.g., node 200A1) is mirrored to the NVRAM (e.g., 160B1) of the DR primary partner node (e.g., node 200B1) and maintained in the NVRAM of the DR primary partner node. Note, NVRAM information also may be mirrored to other nodes, such as the node's (200A1) HA partner node (e.g., node 200A2) and DR auxiliary partner node (e.g., node 200B2). As part of a switchover sequence performed by the DR primary partner node (e.g., 200B1) in response to a failure of the cluster at the site of the local node (e.g., cluster 110A at Site A), the DR primary partner node may take over and replay the mirrored information maintained in its NVRAM (e.g., 160B1), and otherwise take over. For mirrored aggregates (e.g., aggregate 130A1$_1$), if certain plexes (e.g., Plex 0) located at the failed site (e.g., Site A) are no longer operable, the switchover may utilize the plexes (e.g., Plex 1) at the other site (e.g., Site B).

Further, since the DR primary partner node (e.g., 200B1) itself has an HA partner node (e.g., DR auxiliary partner node 200B2), it should be understood that information in the NVRAM (e.g., 160A1) of a local node (e.g., node 200A1) mirrored to the DR partner node (e.g., 200B1) may further be mirrored to the DR auxiliary partner node (e.g., node 200B2). This may allow the DR auxiliary partner node (e.g., node 200B2) to take over for the local node (e.g., node 200A1) in case of multiple failures (e.g., a failure also to DR primary partner node 200B1).

Figure 2:
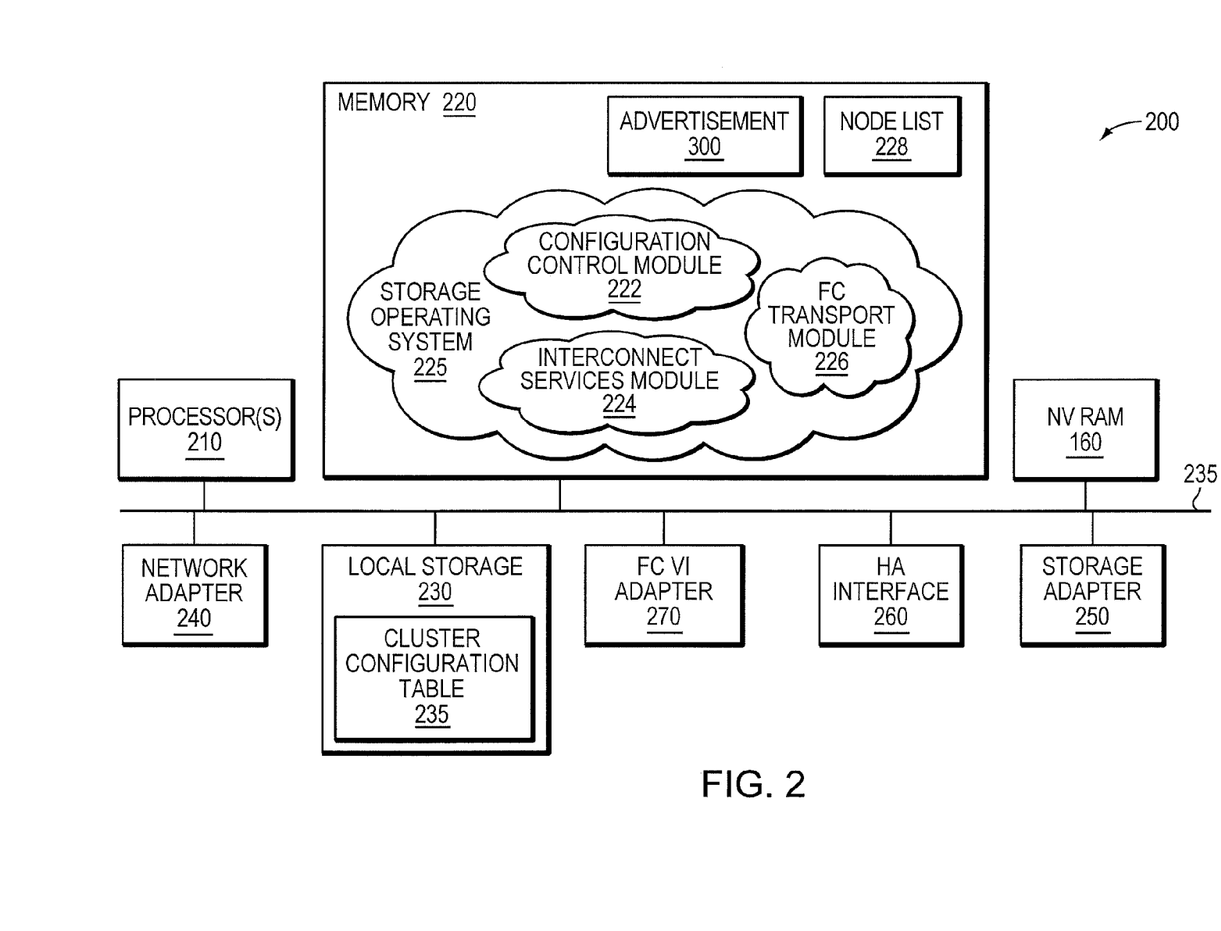
FIG. 2 is a block diagram of an example node that may be utilized in the peered cluster storage environment.

FIG. 2 is a block diagram of an example node 200 that may be utilized in the peered cluster storage environment 100. The node 200 may be generally organized as a network element and a disk element, wherein the network element includes functionality embodied as a network protocol stack that enables the node to connect to clients over the network and the disk element includes functionality embodied as a storage server that provides data paths for accessing information stored on one or more storage devices. In an aspect of the subject matter, a discovery phase of a configuration technique described herein may be performed at the network element, whereas node and cluster setup phases of the configuration technique may be performed at the disk element.

Illustratively, the node 200 may include one or more processors 210, a memory 220, local storage 230, a network adapter 240, a FC virtual interface (VI) adapter 270, an HA interface 260, a storage adapter 250, and NVRAM 160 interconnected by a system interconnect 235, such as bus. The memory 220 may include memory locations that are addressable by the processor and adapters for storing software programs and/or processes and data structures associated with the subject matter described herein. The processor and adapters may, in turn, include processing elements and/or logic circuitry configured to execute the processes, such as automatic configuration processes, and manipulate the data structures, such as node list 228 and advertisement 300, to implement the technique described herein.

It will be apparent to those skilled in the art that other processing and memory means, including various computer readable media, may be used for storing and executing program instructions pertaining to the subject matter herein. It is also expressly contemplated that the various processes, software layers, architectures and procedures described herein can be implemented in hardware, firmware, software or a combination thereof. Moreover, it is expressly contemplated that the various software programs, processes, and layers described herein may be embodied as modules configured to operate in accordance with the disclosure, e.g., according to the functionality of a similar program, process or layer. To that end, the automatic configuration processes may illustratively be embodied as modules including a configuration control module 222, an interconnect services module 224 and an FC transport module 226.

A storage operating system 225, portions of which are typically resident in memory and executed by the processor 210, functionally organizes the node 200 by, inter alia, invoking operations in support of storage services implemented and provided by the node. An example of a storage operating system that may be used with the subject matter herein is the NetApp® Data ONTAP™ operating system available from NetApp Inc., Sunnyvale, Calif. that implements a WAFL® file system. However, a variety of other types of storage operating systems that implement other types of file systems may alternatively be utilized. Illustratively, the storage operating system 225 may be implemented as a set of kernel mode processes.

The local storage 230 may include one or more local storage devices, such as hard disk drives or solid state drives illustratively embodied as flash storage devices, utilized by the node to persistently store configuration information, e.g., as cluster configuration table 235, provided by one or more processes or modules that execute on the node 200. The network adapter 240 may include one or more ports adapted to couple the node 200 to the clients over the computer network, which may, for example, take the form of an Ethernet network, an Infiniband network or a FC network. As such, the network adapter 240 may include a network interface controller (NIC) that may include a TCP/IP offload engine (TOE) and/or an iSCSI host bus adapter (HBA). Likewise, the storage adapter 250 may include one or more ports adapted to couple the node 200, via a switch (e.g., FC switch) 120, to storage devices of the shared storage 150, and cooperate with the storage operating system 225 executing on the node 200 to service operations (e.g., data access requests). In one implementation, the storage adapter takes the form of an FC host bus adapter (HBA).

The NVRAM 160 may log information, such as operations (e.g., data access requests) serviced by the node 200 that have not yet been committed (i.e., persistently stored) to the storage devices. Such information may be maintained in a local portion of the NVRAM 160. Further, to permit takeover and switchover operations, the NVRAM may also store mirrored copies of logged information of other nodes in the environment 100 (e.g., the node's HA partner node, DR primary partner node, and DR auxiliary partner node). Such information may be maintained in respective other portions of the NVRAM 160. In order to persistently store the logged information, the NVRAM 160 may include a back-up battery, or be designed to intrinsically have last-state retention capability (e.g., utilize non-volatile semiconductor memory) that allows the NVRAM to maintain information through system restarts, power failures, and the like.

The HA interface 260 may include port circuitry adapted to couple the node 200 to an HA partner node of a cluster 110 via the HA interconnect 125. The HA interface 260 may be utilized to mirror (copy) the logged information, such as operations (e.g., data access requests), maintained in the NVRAM of the node 200 to the NVRAM of its HA partner node, for example, utilizing a remote direct memory access (RDMA) protocol. The FC-VI adapter 270 may include port circuitry adapted to couple the node 200 to its DR primary and auxiliary partner nodes (as well as to its HA partner node) over switches (e.g., FC switches) 120 of the FC fabric 180. Similar to the HA interface, the FC-VI adapter 270 may be utilized to mirror (copy) certain logged information, such as operations (e.g. data access requests), maintained in the NVRAM of the node 200 to the NVRAM of its DR partner utilizing a RDMA-based FC protocol, such as the FC-VI protocol.

The subject matter herein is directed to a technique for efficiently configuring the peered cluster storage environment 100. The peered cluster storage environment may include a plurality of nodes 200 interconnected over short and long distance communication media and configured to communicate using various protocols, such as the FC protocol. The communication media (hereinafter "interconnects") may include HA interconnects 125 that embody various types of high-speed connection media, such as Infiniband or Ethernet, and FC interconnects 185 that embody high performance serial communication media, such as unidirectional fibers. A plurality of FC switches 120 may cooperate to provide a communication fabric (e.g., FC fabric) 180 configured to facilitate communication among the nodes 200 over the FC interconnects 185 in accordance with the FC protocol. Illustratively, the peered cluster storage environment 100 may be organized as a disaster recovery (DR) group including two HA groups, wherein each HA group includes two nodes.

The configuration technique illustratively includes three phases: a discovery phase, a node setup phase and a cluster setup phase. The discovery phase may be employed to initiate discovery of nodes 200 of the DR group through transmission of multicast advertisement packets (advertisements) by the nodes over the interconnects, including the FC fabric 180, to each other node of the group. In the node setup phase, each node of a cluster 110 assigns its relationships to the nodes discovered and present in the FC fabric 180; illustratively, the assigned relationships include HA partner, DR primary partner and DR auxiliary partner. In the cluster setup phase, the discovered nodes of the FC fabric are organized as the peered cluster storage environment 100 (DR group) configured to service data in a highly reliable and available manner.

Discovery Phase

Figure 3:
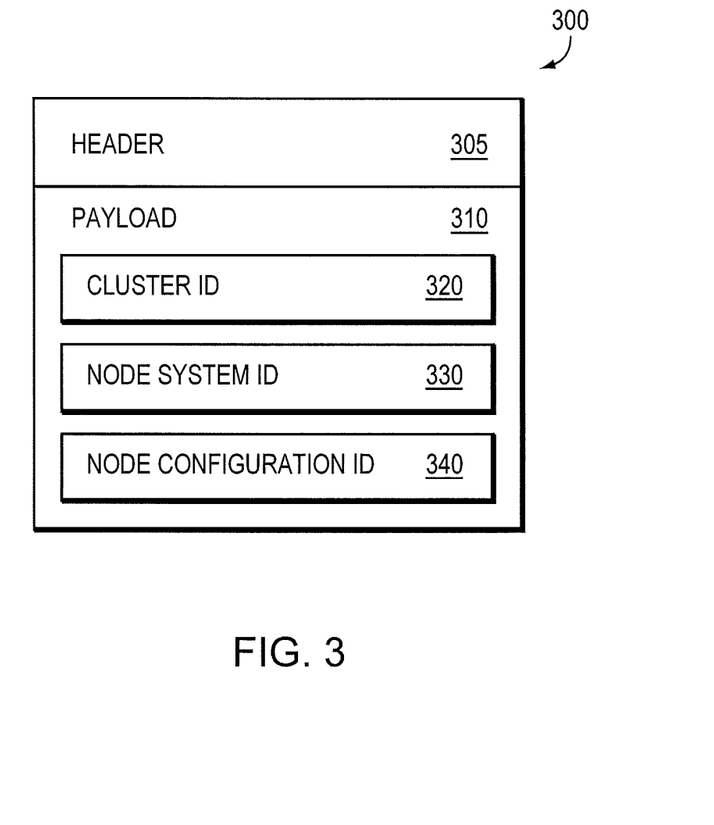
FIG. 3 is a block diagram of an example advertisement that may be utilized to advertise presence of the node in the peered cluster storage environment.

In the discovery phase, each node 200 may advertise its presence to other nodes connected to the communications (e.g., FC) fabric 180. However, unlike a traditional heartbeat mechanism, advertisement among the nodes of the fabric may occur before communication channels are established (setup), i.e., advertisement may be a pre-requisite for setting up the channels. In order to maximize availability, node advertisement may occur over all available interconnects (e.g., FC and Ethernet) using various transport protocols (transports). For example, one or more advertisements 300 may be transmitted from a node 200 requesting to join the DR group to other nodes connected to the HA interconnects 125 and FC fabric 180. These advertisements 300 are illustratively transmitted as out-of-band multicast packets before communication channels are established across all transports. However, not all transports support multicast transmission. For example, although iWARP and InfiniBand may support out-of-band multicast messages over transports such as TCP and Infiniband architecture, respectively, the FC protocol, such as FC-SL-3, does not generally support multicast transmission.

Therefore, in an aspect of the subject matter, multicast transmission of the advertisements 300 over the FC fabric

180 may be effected by leveraging an Extended Link Service (ELS) of the FC protocol. ELS provides a "Test" service to validate the presence of a receiving node in the fabric 180. The payload of the ELS-based advertisement 300 may be determined by an upper layer protocol, such as configuration control module 222. Illustratively, the ELS service may cooperate with the FC transport module 226 to identify various ports that are present in the fabric 180 (and hence in the environment 100). The FC transport module 226 may simulate multicast transmission by transmitting the advertisement 300, e.g., one-by-one, over ports of the FC-VI adapter 270 using ELS.

Broadly stated, a node 200 may join the FC fabric 180 by logging into a port of the FC-VI adapter 270 in accordance with FCP, thereby indicating the presence of the port in the fabric. The node 200 may then generate advertisement 300 having a payload that includes role identification information of the node, and employs ELS to send the advertisement over each port of the FC-VI adapter 270 connected to each node present in the fabric 180. The multicast transmission involves transmitting the advertisement over the ports associated with nodes which have logged into the fabric 180. ELS-based advertisement packets are constantly transmitted over the FC fabric (e.g., every second); however a receiving node receives an initial advertisement from a transmitting node, no other advertisements from the transmitting node need be processed at the receiving node because the properties of the transmitting node should not change as long as the node/link is healthy, e.g., as determined by reception of periodic "heartbeat" messages. Each receiving node present in the FC fabric 180 may locally store (cache) the role identification information associated with the advertisements 300 from all other transmitting nodes, e.g., on local storage 230 of the node 200. During the discovery phase, the cached identification information is used to identify the nodes available in the cluster, along with their role information. Once discovery is complete, each node may determine those other nodes that are present in the FC fabric 180.

In an aspect of the subject matter, the role identification (payload) information of advertisement 300 provides sufficient information to identify the role of each node in the DR group. Illustratively, the interconnect services module 224 may originate the advertisement exchange in response to the payload information provided by the configuration control module 222. Multicast transmission of the advertisement 300 over all available transports and interconnects may then be effected through cooperation with various transport modules, e.g., iWARP, Infiniband and, illustratively the FC transport module 226, to the other nodes coupled to the various interconnects and fabric. As noted, the role identification information may be exchanged at frequent intervals and, even though the information contained in subsequent exchanges may not be processed at the receiving node, reception of the advertisement may serve as a connection heartbeat. Hence, if a node does not respond for a certain interval, the communication channel may be gracefully unconnected to thereby facilitate maintenance of appropriate availability status of a partner node by the configuration control module 222.

FIG. 3 is a block diagram of an example advertisement that may be utilized to advertise the presence of the node in the peered cluster storage environment. The advertisement 300 illustratively includes a header 305 and a payload 310 containing role identification information embodied as properties of the node that are advertised through transmission of the advertisement. In an aspect of the subject matter, the properties advertised by each node may include (i) a cluster identifier (ID) 320 which identifies the cluster associated with the node 200, (ii) a node system ID 330 which is a unique number (e.g., NVRAM ID) that identifies the system hardware, and (iii) a node configuration ID 340 which is illustratively embodied a universally unique ID (UUID) that identifies the node in the cluster.

Upon receiving the advertisement 300 from an appropriate transport module (e.g., FC transport module 226) of a receiving node 200, the interconnect services module 224 may pass the role identification information of payload 310 onto the configuration control module 222. Illustratively, the configuration control module 222 may process the information to render assignment relationships, i.e., partner roles, according to an algorithm of the configuration technique described herein. After determining the partner roles, the configuration control module 222 may communicate with the interconnect services module 224 as to the role of the transmitting node that sent the advertisement 300. The interconnect services module 224 may then set up appropriate communication channel(s) needed to effect communication among the nodes; however, the interconnect services module 224 may not set up the communication channel(s) until the configuration control module 222 provides the role identification information, and any subsequent advertisements 300 from the same node may be forwarded to the configuration control module 222.

Figure 4:
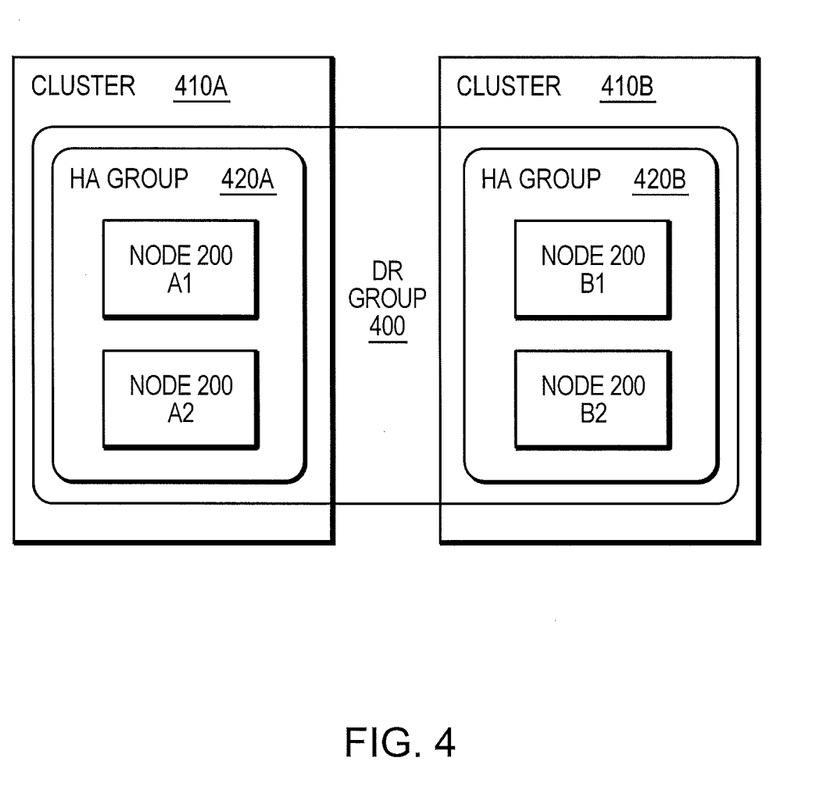
FIG. 4 is a block diagram of an example disaster recovery (DR) group configuration.

In an aspect of the subject matter, a "like-to-like" (e.g., same number and type of node) configuration at each cluster of the DR group is illustratively employed. FIG. 4 is a block diagram of an example DR group configuration. Illustratively, the exemplary DR group 400 may be organized as four nodes 200, where a HA group 420A,B of each cluster 410A,B includes two nodes. Upon joining the FC fabric 180, a new node may send the multicast advertisement 300 with its identifying information (payload 310) to all existing nodes of the DR group 400. In response, each node (including the new node) may determine a total number of nodes in the cluster 410. If, for example, inclusion of the new node would extend the configuration of the DR group 400 to five nodes, a configuration error (misconfiguration) state may be declared that requires correction of the fabric configuration by, e.g., an administrator.

In an aspect of the subject matter, an alternative configuration of a DR group 400 may support various numbers (e.g., n×n) nodes, wherein each HA group 420 of the DR group may scale from 1 to n nodes. In addition, a configuration mechanism with one or more policy changes may be extended to include different numbers of nodes on each cluster site. The subject matter herein broadly covers multiple nodes, possibly in an (n×m) configuration, i.e., a configuration having different numbers of nodes on different cluster sites. For more than two nodes in an HA group 420, NVRAM mirroring (HA/partner) may be distributed among all of the nodes.

Node Setup Phase

In the node setup phase, each node 200 of a cluster 410 receiving the advertisement(s) may process the node properties of the advertisement(s) to assign its relationships to the other discovered nodes to thereby establish partner node (e.g., HA, DR) pairs. Illustratively, the configuration control module 222 may configure its node by, e.g., assigning a role of local node to itself and assigning partner roles to each of the discovered nodes. For example, a node on the same local cluster as the local node becomes an HA partner of the local node, while a node on the remote (DR) cluster may become a DR primary partner or DR auxiliary partner of the local node. The assignment of roles may be determined according to an algorithm of the configuration control module 222 that specifies sorting and ordering of discovered nodes on each HA group 420 to thereby enable pairing of partners (i.e., HA partner, DR primary partner or DR auxiliary partner) based on, e.g., ordinal numbering of node system IDs. The configuration control module 222 of each node may construct and organize the resulting assignments as node list 228 indicating the roles and relationships among all nodes of, e.g., the DR group 400.

Illustratively, the configuration algorithm specifies sorting of the discovered nodes by cluster ID 320, e.g., into a set of nodes for each cluster, and then ordering of the set of nodes by the node system ID. The node system ID 330 may include the NVRAM system ID or other uniquely identifiable number for each node. Thereafter, the ordered nodes are assigned ordinal numbers (e.g., 1, 2, 3, etc.) and paired both within and across HA groups 420 for each cluster 410, e.g., local cluster 410A and remote cluster 410B. For example, assume node ID 1 of cluster 410A is assigned ordinal number A1, node ID 2 of cluster 410A is assigned ordinal number A2, node ID 11 of cluster 410B is assigned ordinal number B1, and node ID 12 of cluster 410B is assigned ordinal number B2. According to the algorithm, nodes A1/A2 may be assigned HA partner pairs and nodes B1/B2 may be assigned HA partner pairs within the HA groups 410A and B, respectively. In addition, nodes A1/B1 may be assigned DR primary partners, nodes A2/B2 may be assigned DR primary partners, nodes A1/B2 may be assigned DR auxiliary partners, and nodes A2/B1 may be assigned DR auxiliary partners across the HA groups 410A and B, respectively.

In an aspect of the subject matter, the node system ID 330 (or NVRAM ID) may be specific to a controller (node) whereas the node configuration ID 340 may be specific to the storage system (node and storage devices/array). Changing a controller does not affect node setup because once configured, the roles of the nodes are persistently stored in, e.g., the local storage 230 configured as a replicated database (RDB). After initial discovery of the nodes, the relationships are typically not changed/altered. If a new controller (C1) with a different NVRAM ID replaces a previous controller (A1), the new controller (C1) may maintain the role of the previous controller (e.g., A1's role) within the DR group 400. Each node may be notified of the replacement and may substitute C1 for A1 in its persistent local storage (RDB). However, if a new node appears after initial discovery and configuration, the new node may be assigned an additional HA partner or DR primary/auxiliary partner role.

Figure 5:
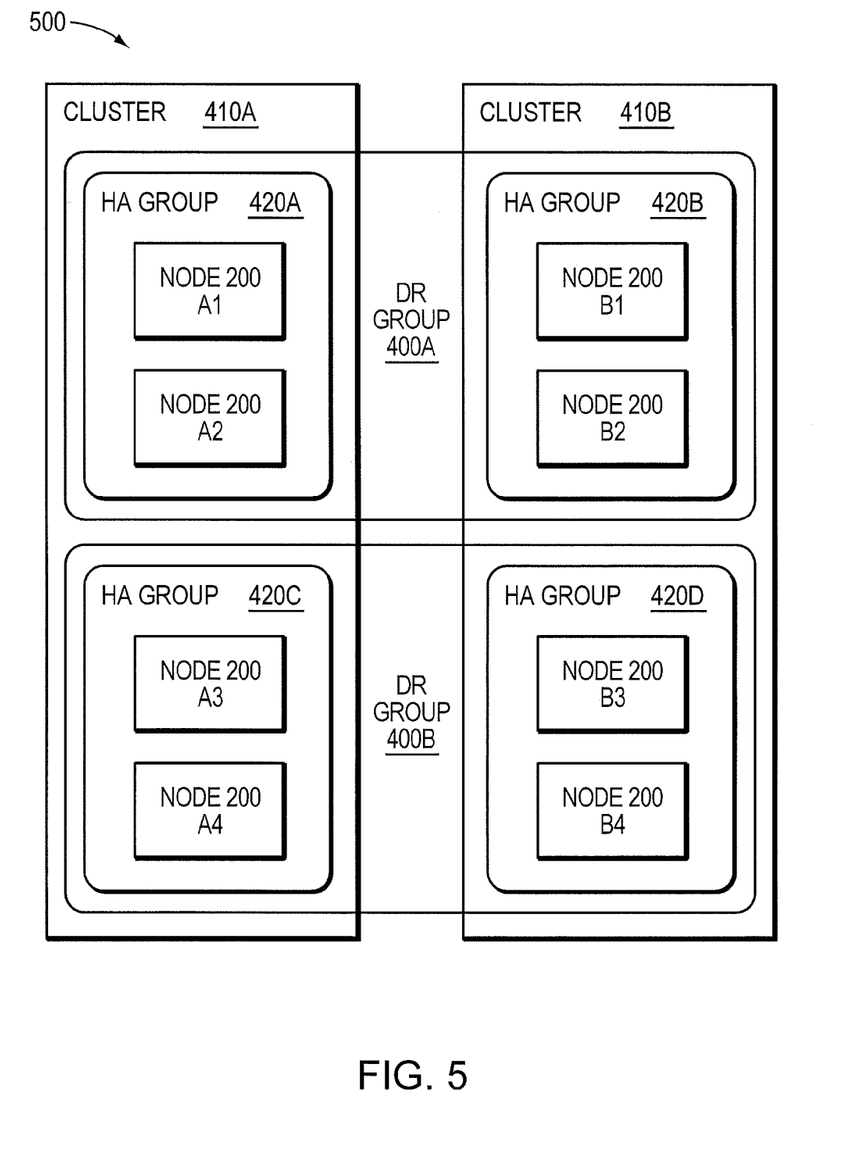
FIG. 5 is a block diagram of an example multiple DR group configuration.

In an aspect of the subject matter, there may be multiple DR groups 400A,B among the two clusters 410A,B. FIG. 5 is a block diagram of an example multiple DR group configuration 500, wherein DR group 400A may include node HA partner node pairs A1/A2 of HA group 420A and HA partner node pairs B1/B2 of HA group 420B. In addition, DR group 400B may include HA partner node pairs A3/A4 of HA group 420C and HA partner node pairs B3/B4 of HA group 420D. Moreover, nodes A1/B1 may be assigned DR primary partners, nodes A2/B2 may be assigned DR primary partners, nodes A1/B2 may be assigned DR auxiliary partners, and nodes A2/B1 may be assigned DR auxiliary partners across the HA groups 410A and B, respectively. Furthermore, nodes A3/B3 may be assigned DR primary partners, nodes A4/B4 may be assigned DR primary partners, nodes A3/B4 may be assigned DR auxiliary partners, and nodes A4/B3 may be assigned DR auxiliary partners across the HA groups 410C and D, respectively. It should be noted that the cluster 410A,B may be grown or "scaled" by adding one or more DR groups, e.g., a new DR group 400C (not shown). Alternatively, scaling may be effected by the individual HA group 420A-D using, e.g., n-way support. That is, each HA group 420 may be expanded independently (even asymmetrically), e.g., HA group 420A may be expanded to include three nodes and HA group 420B may be expanded to include five nodes.

Cluster Setup Phase

In the cluster setup phase, each node may establish its view of the DR group configuration, i.e., the local DR group configuration, in response to a command (which is agnostic to a node). The command may be issued by an administrator, although in an aspect of the subject matter, the command may be invoked (called) automatically by, e.g., the configuration control module 222 once a predetermined policy is satisfied. Automatic verification advantageously enables monitoring of the configuration and operational states of all nodes in the DR group without administration involvement. Illustratively, the command may instruct each node to commit the node list 228 (constructed and organized by the configuration control module 222 of each node) to the RDB of the local storage 230 to thereby persistently store the local DR group configuration. A cluster-wide application programming interface (API) may be employed to allow the node to commit the node list 228 to the RDB. Cluster-level activities may then be performed at the node, including verification of the software and hardware DR group configuration and, once verified, activation of mirroring (e.g., NVRAM mirroring and write cache mirroring). Cluster-level verification (check) may be enabled by a globally reachable service embodied as a data structure (e.g., cluster configuration table 235) that is replicated on each node to enable the node to verify its notion of the peer clustered storage environment (e.g., DR group) configuration. Note that the node's notion of the local DR group configuration may be embodied as the node list 228, which is compared with the global (replicated) DR group configuration embodied as the cluster configuration table 235.

For example, an administrator of the DR group may enter (e.g., into an administrator console or terminal) a command to configure and initiate verification of the DR group 400. Alternatively, cluster configuration and verification may be performed automatically by, e.g., the configuration control module 222 calling the command once a minimum number of nodes is discovered that matches/satisfies the predetermined policy. In response to the command, each node may commit its node list 228 to the RDB, e.g., using the API. In an aspect of the subject matter, a "master" node within the DR group may be elected and assigned responsibility for management of the global cluster configuration used to verify the content of the cluster configuration table 235 as constructed by each node of the group. Illustratively, the cluster configuration table 235 of RDB is constructed by the configuration control module 222 in response to role identification information obtained through advertisements 300, e.g., on a first come first serve node basis.

Election of the master node may illustratively occur through a message exchange (different from the ELS-based advertisement 300) among the nodes of the DR group, wherein the master node is elected based on, e.g., node/NVRAM system ID 330, such as the lowest ID. That is, the node having the lowest ID may be elected the master node, which is then assigned the responsibility of managing the cluster configuration and verification activities of the cluster setup phase. The master node may the propagate the cluster configuration table 235 to all of the nodes for RDB storage on their local storage 230. Each node may check the configuration table 235 (using conventional synchronization mechanisms) to verify its view of DR group configuration, i.e., as embodied by its node list 228. Each node may be queried as to agreement with the state of the DR group configuration and, if a node disagrees, an error (misconfiguration) occurs, which may be reported to the administrator for resolution. However, if each node agrees with the state of the configuration, mirroring (e.g., NVRAM mirroring and write cache mirroring) may be activated.

Figure 6:
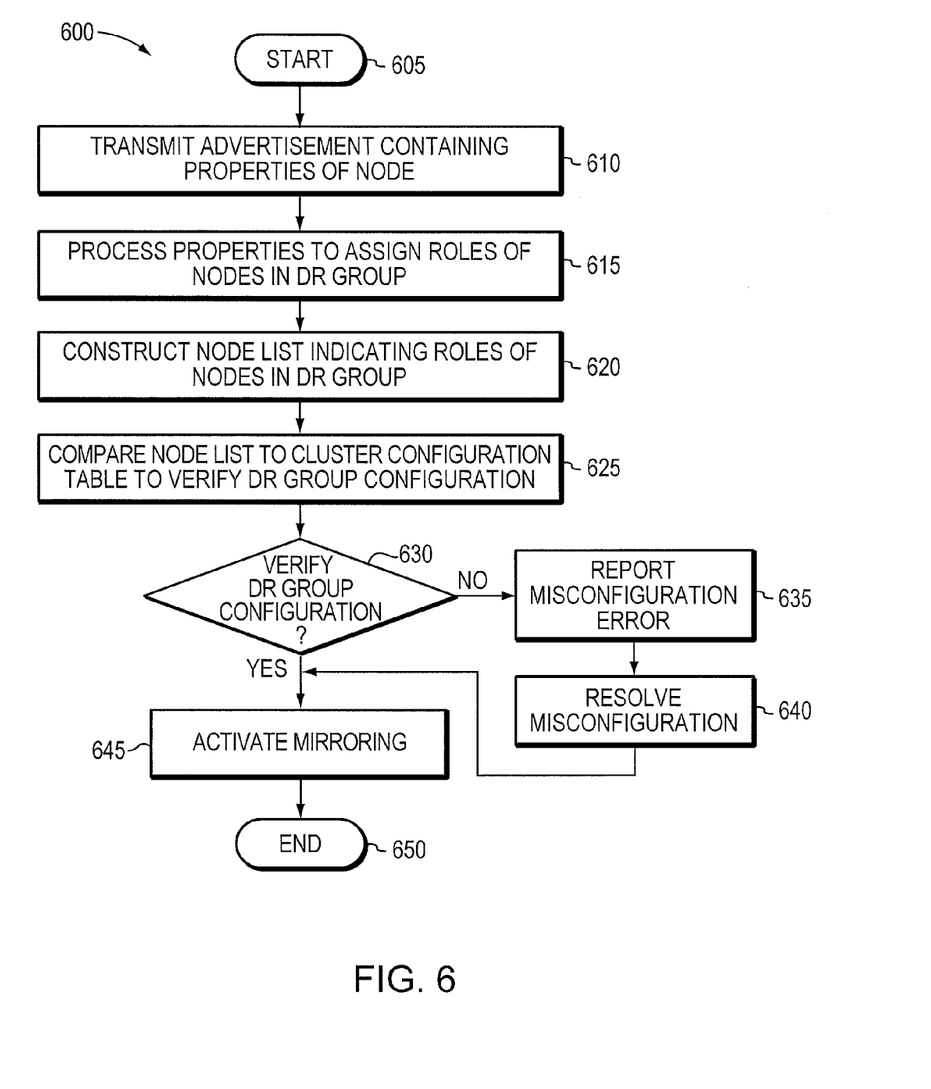
FIG. 6 is an example simplified procedure for efficiently configuring a peered cluster storage environment organized as a DR group.

FIG. 6 is a an example simplified procedure for efficiently configuring a peered cluster storage environment organized as a DR group. The procedure 600 starts at step 605 and proceeds to step 610 where nodes of the DR group are discovered through transmission of multicast advertisements among the nodes of the group, wherein the payload of each advertisement contains role identification information embodied as properties of the node transmitting the advertisement. At step 615, each node of the DR group receiving the advertisement(s) processes the node properties of the advertisement to assign roles to the other discovered nodes in the form of HA and DR partner node pairs, wherein the assignment of roles is determined by sorting and ordering of discovered nodes to enable pairing of the partners (i.e., HA partner, DR primary partner or DR auxiliary partner) based on, e.g., ordinal numbering of node system IDs. At step 620, each node constructs the resulting assignments as a node list indicating the roles (and relationships) among all nodes of the DR group. At step 625, each node verifies the DR group configuration by, e.g., comparing the node list to a cluster configuration table replicated at each node. At step 630, a determination is rendered as to whether the node verifies the state of the DR group configuration. If not, a misconfiguration error is reported, e.g., to an administrator at step 635 and the misconfiguration is resolved at step 640. However, if the node does verify the state of the DR group configuration, cluster-level activities such as mirroring are activated at step 645 and the procedure ends at step 650.

Advantageously, the configuration technique described herein enables efficient configuration of a peered cluster storage environment (DR group) in an automatic, i.e., without human intervention, manner that provides ease of use, while reducing human error. In addition, the transmission of certain information during the discovery and cluster setup phases of the configuration technique enables gradual construction of a DR group (as well as subsequent scaling of the group) through non-disruptive operation of its constituent nodes. For example, nodes of two distinct HA groups, each operating independently to serve data, may be combined to form a DR group through the exchange of node advertisements and propagation (and replication) of configuration information among the nodes. Moreover, the configuration technique provides a multicast approach for Fibre Channel out-of-band communication.

The foregoing description has been directed to specific subject matter. It will be apparent, however, that other variations and modifications may be made to the described subject matter, with the attainment of some or all of its advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the subject matter herein. Therefore, it is the object of the appended claims to cover all such variations and modifications as come within the true spirit and scope of the subject matter herein.

What is claimed is:

1. A computing device comprising:
   a memory containing computer readable medium comprising machine executable code having stored thereon instructions for performing a method; and
   a processor coupled to the memory, the processor configured to execute the machine executable code to cause the processor to:
   receive advertisements, over a communication fabric, sent to a first node by nodes of a DR group comprising the first node and the nodes;
   process the advertisements to assign roles to the nodes, wherein the roles include a high availability (HA) partner role, a disaster recovery (DR) primary partner role, and a DR auxiliary partner role;
   construct a node list, indicating the roles assigned to nodes of the DR group and relationships among nodes of the DR group, as a DR group configuration; and
   perform a cluster setup phase wherein the first node commits the node list to local storage to persistently store the DR group configuration and verifies the DR group configuration by comparing the node list to a cluster configuration table to determine whether the assignment of the roles of the HA partner role, the DR primary partner role, and the DR auxiliary partner role are correct.

2. The computing device of claim 1, wherein the advertisements are multicast configuration packets.

3. The computing device of claim 1, wherein the machine executable code causes the processor to:
   perform a discovery phase to initiate discovery of the nodes of the DR group through multicast transmission of the advertisements over the communication fabric.

4. The computing device of claim 3, wherein the communication fabric is a Fibre Channel (FC) fabric and wherein the multicast transmission of the advertisements over the FC fabric uses an Extended Link Service (ELS) of an FC protocol.

5. The computing device of claim 4, wherein the machine executable code causes the processor to: cooperate with the ELS to identify ports, of an adapter of the first node, that are present in the FC fabric.

6. The computing device of claim 3, wherein the machine executable code causes the processor to: simulate the multicast transmission by transmitting the advertisements one-by-one over ports of an adapter of the first node.

7. The computing device of claim 1, wherein a payload of an advertisement of a node comprises role identification information embodied as properties of the node.

8. The computing device of claim 7, wherein the properties comprise:
   a cluster identifier (ID) that identifies a cluster associated with the node; and
   a node system ID that identifies hardware of the node.

9. The computing device of claim 8, wherein the node system ID comprises a non-volatile random access memory (NVRAM) ID.

10. The computing device of claim 1, wherein the machine executable code causes the processor to: perform a node setup phase to assign the roles to nodes discovered in the communication fabric.

11. The computing device of claim 1, wherein the machine executable code causes the processor to: assign partner roles to the nodes according to an algorithm that specifies sorting and ordering of the nodes on HA groups, of the DR group, to enable pairing of partner nodes based on ordinal numbering of node system IDs.

12. The computing device of claim 7, wherein the properties comprise a node system ID that identifies hardware of the node.

13. The computing device of claim 7, wherein the properties comprise a cluster identifier (ID) that identifies a cluster associated with the node.

14. The computing device of claim 1, wherein the node list is persistently stored in response to a command that is automatically invoked by a configuration control module.

15. The computing device of claim 1, wherein verification of the DR group configuration is enabled by a globally reachable service configured as the cluster configuration table that is replicated on each node of the DR group.

16. The computing device of claim 1, wherein the DR group configuration of the node list is compared with global DR group configuration of the cluster configuration table to verify the DR group configuration.

17. The computing device of claim 1, wherein mirroring is activated in the DR group in response to verification of the DR group configuration.

18. The computing device of claim 17, wherein the mirroring comprises one of non-volatile random access memory (NVRAM) mirroring and write cache mirroring.

19. A method, comprising:
receiving advertisements, over a communication fabric, sent to a first node by nodes of a DR group comprising the first node and the nodes;
processing the advertisements to assign roles to the nodes, wherein the roles include a high availability (HA) partner role, a disaster recovery (DR) primary partner role, and a DR auxiliary partner role;
constructing a node list, indicating the roles assigned to nodes of the DR group and relationships among nodes of the DR group, as a DR group configuration; and
performing a cluster setup phase wherein the first node commits the node list to local storage to persistently store the DR group configuration and verifies the DR group configuration by comparing the node list to a cluster configuration table to determine whether the assignment of the roles of the HA partner role, the DR primary partner role, and the DR auxiliary partner role are correct.

20. A non-transitory computer readable medium comprising program instructions, which when executed by a processor, causes the processor to:
receive advertisements, over a communication fabric, sent to a first node by nodes of a DR group comprising the first node and the nodes;
process the advertisements to assign roles to the nodes, wherein the roles include a high availability (HA) partner role, a disaster recovery (DR) primary partner role, and a DR auxiliary partner role;
construct a node list, indicating the roles assigned to nodes of the DR group and relationships among nodes of the DR group, as a DR group configuration; and
perform a cluster setup phase wherein the first node commits the node list to local storage to persistently store the DR group configuration and verifies the DR group configuration by comparing the node list to a cluster configuration table to determine whether the assignment of the roles of the HA partner role, the DR primary partner role, and the DR auxiliary partner role are correct.

* * * * *